Figure 3:
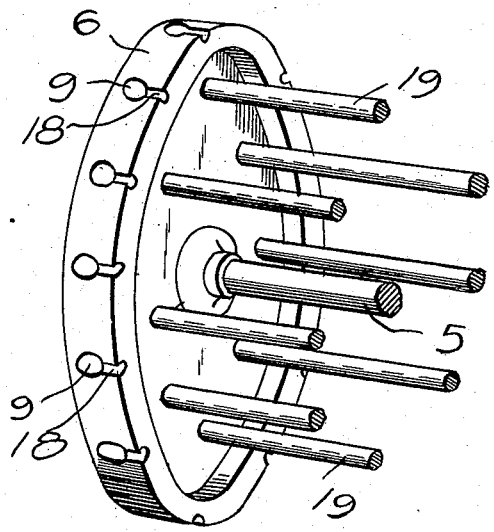

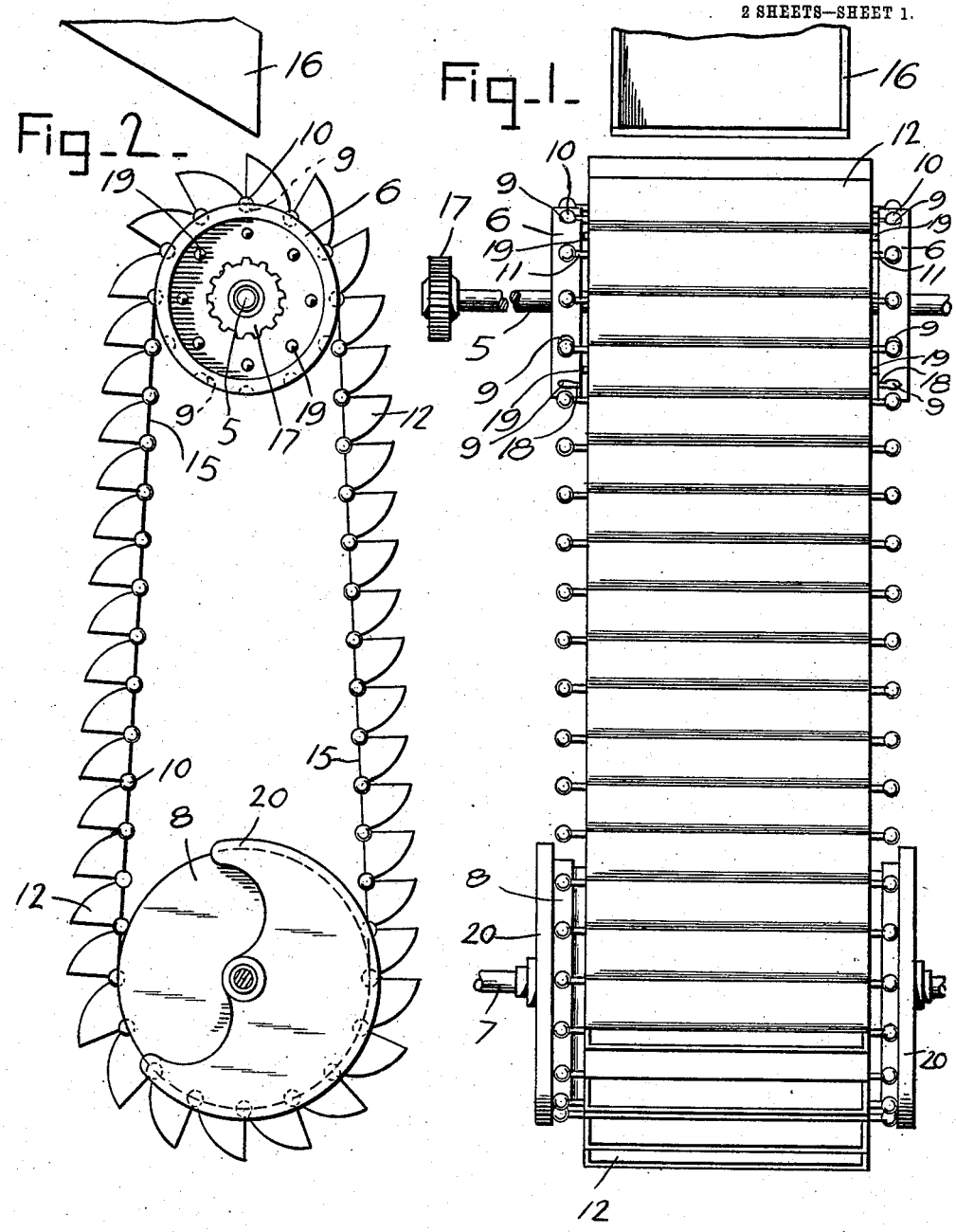

No. 867,817.

PATENTED OCT. 8, 1907.

C. M. GIRTON.
WATER MOTOR.
APPLICATION FILED MAY 2, 1907.

2 SHEETS—SHEET 2.

Witnesses
Inventor
Charles M. Girton
Attorneys

UNITED STATES PATENT OFFICE.

CHARLES M. GIRTON, OF JERSEYTOWN, PENNSYLVANIA.

WATER-MOTOR.

No. 867,817.   Specification of Letters Patent.   Patented Oct. 8, 1907.

Application filed May 2, 1907. Serial No. 371,484.

*To all whom it may concern:*

Be it known that I, CHARLES M. GIRTON, a citizen of the United States, residing at Jerseytown, in the county of Columbia, State of Pennsylvania, have invented certain new and useful Improvements in Water-Motors; and I do hereby declare the following to be a full, clear, and exact description of the invention, such as will enable others skilled in the art to which it appertains to make and use the same.

The present invention relates to water motors, and it aims to provide an exceedingly simple as well as highly efficient device of that class in which the power transmitting shaft is driven by the force of a stream of water flowing into an endless chain of buckets, which pass around the sprockets carried by said shaft, and around an idler wheel carried by a second shaft located at the bottom of the fall.

To this end, the invention consists in the construction, combination, and arrangement of parts, all as hereinafter more fully described, specifically claimed, and illustrated in the accompanying drawings, in which like parts are designated by corresponding reference numerals in the several views.

Figure 4:
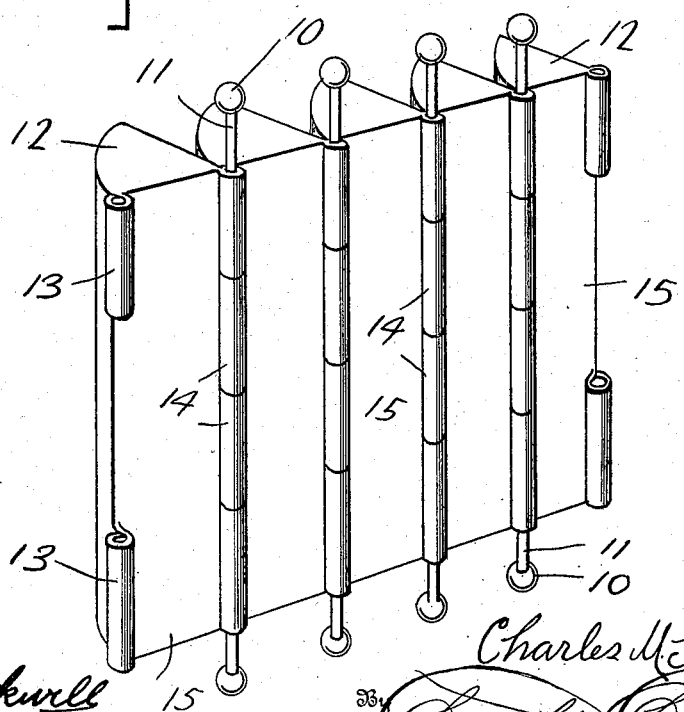

Of the said drawings—Figure 1 is a front elevation of the present invention. Fig. 2 is side elevation thereof. Fig. 3 is a detail perspective view of one of the sprocket wheels. Fig. 4 is a fragmental perspective view of a portion of the endless chain of buckets.

In its practical embodiment the motor includes an upper or main shaft 5, carrying a pair of sprocket wheels 6, arranged in spaced relation to each other, and a lower or secondary shaft 7, upon which an idler wheel 8 is loosely mounted, said idler being located directly beneath the space between the sprocket wheels on the main shaft. The shafts 5 and 7 are disposed horizontally at the top and bottom of the fall, respectively, as shown.

The periphery of each sprocket wheel 6 is provided with a series of approximately hemispherical depressions or seats 9, which are adapted to receive the spherical knobs 10, formed on opposite ends of the rods 11, to which the members of an endless chain of buckets 12 are pivotally connected.

Each bucket, as shown, is triangular in cross-section, and its apex, which is directed towards the bottom of the fall, is provided with a pair of longitudinal knuckles 13, which are arranged in spaced relation and adapted to coöperate with the knuckles 14, located upon the upper edge of the back 15 of the preceding bucket, in forming a sleeve for the reception of the hinge rods 11.

It will be apparent from the foregoing that when the chain of buckets, which connects the main and secondary shafts, is in place, the knobs 10 formed on the ends of the hinge rods will engage in the seats 9, formed in the periphery of the sprocket wheels, and the force of the water which flows through the sluice 16 and fills the buckets successively will cause the chain of buckets to travel around the sprockets 6 and idler 8, and thereby effect the rotation of the main shaft 5, which latter is provided with a transmission gear 17 which meshes with a similar gear carried by the driven shaft, not shown.

Each seat 9 formed in the sprocket wheels may, if desired, be provided with a radially extending groove 18, into which the adjacent end of the hinge rod fits.

The entire invention, as will be understood, is somewhat in the nature of an overshot wheel, but is superior thereto in that the point of discharge of water from each bucket is approximately at the bottom of the fall, while the buckets carried by an overshot wheel discharge approximately midway between the top and bottom of the fall. Owing moreover to the fact that the sprockets carried upon the main shaft, are smaller than an overshot wheel, the speed of rotation of the main shaft in the present instance is correspondingly greater than that of a shaft upon which an overshotwheel is mounted.

The sprocket wheels 6 which are located upon the main shaft 5 may be connected adjacent their peripheries by a series of cross-rods 19, thus further preventing any movement of said sprocket wheels relatively to each other. The supplemental shaft 7, upon which the idler wheel 8 is mounted, may be provided, if desired, with a pair of guide-irons 20 disposed upon opposite sides of said idler.

What is claimed, is—

1. The combination, in a water motor, of a main shaft; a secondary shaft located therebeneath; a pair of sprocket wheels carried by said main shaft in spaced relation to each other, said sprocket wheels having their peripheries provided with a series of hemispherical depressions; an idler wheel carried by said secondary shaft and located directly beneath the space between said sprocket wheels; and an endless chain of buckets adapted to travel over said sprocket and idler wheels, said buckets being pivotally connected to a series of rods provided at opposite ends with spherical knobs adapted for engagement in said depressions.

2. The combination, in a water motor, of a main shaft; a secondary shaft located therebeneath; a pair of sprocket wheels carried by said main shaft in spaced relation to each other, the periphery of each sprocket wheel having a series of hemispherical depressions formed therein, each depression having a groove extending radially therefrom; an idler wheel loosely mounted upon said secondary shaft and located directly beneath the space between said sprocket wheels; and an endless chain of triangular buckets adapted to travel over said sprocket and idler wheels, each bucket having a series of knuckles formed on its lower edge for coöperation with the knuckles located upon the rear upper edge of the preceding bucket in forming a sleeve for the reception of a hinge rod, each hinge rod being provided at opposite ends with spherical knobs adapted for engagement in said depressions.

In testimony whereof, I affix my signature, in presence of two witnesses.

CHARLES M. GIRTON.

Witnesses:
J. M. HARMAN,
H. B. GEISINGER.